United States Patent [19]

Asami et al.

[11] Patent Number: 5,028,247

[45] Date of Patent: Jul. 2, 1991

[54] PROCESS FOR THE PREPARATION OF SILICA GLASS POWDERS

[75] Inventors: Muneo Asami; Minoru Yasueda, both of Minamata, Japan

[73] Assignee: Chisso Corporation, Japan

[21] Appl. No.: 511,253

[22] Filed: Apr. 19, 1990

[30] Foreign Application Priority Data

May 18, 1989 [JP] Japan ................... 1-125687

[51] Int. Cl.$^5$ ............................................. C03C 27/00
[52] U.S. Cl. ...................... 65/18.1; 65/18.3; 65/901; 501/12
[58] Field of Search ................ 65/3, 11, 17, 18.1, 65/18.3, 901; 501/12.

[56] References Cited

U.S. PATENT DOCUMENTS

| | | | |
|---|---|---|---|
| 4,339,559 | 7/1982 | McDaniel | 526/106 |
| 4,681,615 | 7/1987 | Toki et al. | 65/18.1 |
| 4,816,299 | 3/1989 | Alpha et al. | 65/18.1 X |
| 4,826,521 | 5/1989 | Wiechmann et al. | 65/18.1 |

FOREIGN PATENT DOCUMENTS

| | | |
|---|---|---|
| 60-54929 | 3/1985 | Japan . |
| 60-65734 | 4/1985 | Japan . |
| 60-239329 | 11/1985 | Japan . |
| 61-256928 | 11/1986 | Japan . |
| 62-100424 | 5/1987 | Japan . |
| 62-176928 | 8/1987 | Japan . |

OTHER PUBLICATIONS

Encyclopedia of Chemical Technology, Kirk-Othmer, 2nd Ed. vol. 18, 1969 p. 67.

*Primary Examiner*—Robert L. Lindsay
*Attorney, Agent, or Firm*—Leydig, Voit & Mayer

[57] ABSTRACT

Silica glass powders are prepared by mixing a silicic acid ester, water in an amount equal and or larger than 0.5 gram equivalent of an alkoxy group of the silicic acid ester and siliceous particles and dispersing the siliceous particles which have particle sizes larger than 400 $\mu$m in an amount of less than 10% by weight and particle sizes of less than 20 $\mu$m in an amount of less than 50% by weight and which are dispersed in an amount equal to or larger than 10% by weight of the weight of silica prepared by roasting the silicic acid ester in the same amount as used for the preparation of the mixture, gelling the dispersion to give a gel, drying the gel, and sintering the dried gel. The silica glass powders of high purity are suitable for various uses such as raw materials for the silica glass products for semiconductor industry and for multicomponent glass for optical communication.

15 Claims, No Drawings

PROCESS FOR THE PREPARATION OF SILICA GLASS POWDERS

BACKGROUND OF THE INVENTION

1. Field of the Invention

The present invention relates to a process for the preparation of silica glass powders and, more particularly, to a process for the preparation of silica glass powders with a simple operation and with high efficiency, which requires no mechanical pulverization step so as avoid contamination of impurities and which can provide highlY purified silica glass powders capable of being appropriatelY used for various purposes, such as raw materials of silica glass products for the semiconductor industry and multicomponent glass for optical communication.

2. Description of Related Art

Recently, there have been increasing demands to purify silica glass powders to be used, for example, as raw materials for silica glass products for the semiconductor industry and multicomponent glass for optical communication.

At present, demands have been made to provide a silicon single crystal of an extremely high purity as integration of semiconductor elements develops to a greater extent, so that highly purified crucibles for preparing such highly purified silicon single crystals have also been demanded.

Heretofore, the crucibles used for the preparation of silicon single crystals for semiconductors have been prepared by melting finely pulverized powders of natural quartz and sintering them in a carbon arc furnace. The finely pulverized powders of natural quartz, however, suffer from contamination of impurities such as aluminium resulting from alumina ball mills used in the pulverizing step, on tope of impurities contained in the natural quartz itself. The crucibles may usually contain impurities such as Al as high as 10 ppm, Fe, Ti, Zr, Na, Ca and K as high as several ppm, as well as B, Cu and Ni as several 10th ppm. If these crucibles are used to prepare silicon single crystals, the impurities contained therein may be transferred to the silicon single crystal, thereby reducing the purity of the silicon single crystal. As a result, a silicon single crystal of an extremely high purity can not be provided.

Further, a transparent silica glass tube of high purity has been demanded for a furnace core tube etc. in the thermal processing step of producing semiconductor wafers. The transparent silica glass tubes have conventionally been prepared from a natural rock crystal containing minute impurities such as aluminium, alkali, etc., so that the transparent silica glass tubes resulting therefrom may also contain such impurities. Hence, conventional silica glass tubes present the problems of heat transformation and lack of transparency resulting from contamination with those impurities.

It is generally known to the art that heat transformation and lack of transparency in silica glass material may occur to a remarkable extent in instances where an alkali metal is present as an impurity. In this respect, a high purity of silica glass powder as a raw material is required.

Mechanical pulverization of natural quartz or synthetic quartz for the preparation of powders of the raw material presents the problem that it can provide the powders in a range of particle sizes from 75μm to 300μm in a yield as low as 50% or lower, while the rest is fine powders having particle sizes of 75 μm or smaller.

SUMMARY OF THE INVENTION

The present invention has the object to providing a novel process for the preparation of silica glass powders of high purity with high efficiency, which can solve the problems contained in conventional processes and satisfy demands from the industry.

As a result of extensive review directed to a solution to the problems, it has been found that silica gel powders can readily be prepared during drying a gel obtained by dispersing a particular amount of siliceous particles with a particular range of particle sizes in a mixture of a silicic acid ester with a particular amount of water and gelling the resulting dispersion and highly pure powders of synthetic silica glass in a pulverized form can readily be obtained by baking the resulting silica gel powders. The present invention has been completed on the basis of this finding.

In order to achieve the object, a preferred aspect of the present invention consists of a process for the preparation of silica glass powders, comprising a step of preparing a dispersion of siliceous particles in a silicic acid ester and water in an amount equal to or larger than 0.5 gram equivalent of an alkoxy group of the silicic acid, wherein said siliceous particles contain particles having particle sizes larger than 400μm in an amount of less than 10% by weight and particles having particle sizes less than 20μm in an amount of less than 50% by weight and wherein said siliceous particles are dispersed in an amount equal to or larger than 10% by weight of the weight of silica prepared by roasting the silicic acid ester, in an amount which is the same as used for the preparation of the mixture; the step of gelling the dispersion to give a gel; the step of drying the gel; and the step of baking the dried gel to obtain a silica glass powder.

DESCRIPTION OF THE PREFERRED EMBODIMENTS (1) Kinds of silicic acid esters

The silicic acid ester may include, for example, methyl silicate, ethyl silicate, propyl silicate or any other silicic acid ester which is capable of forming a solution with water in the presence of an acid or an alkali. In particular, there may preferably be used the silicic acid ester whose alkoxy group has from one to three carbon atoms because the silicic acid ester with the alkoxy group having from one to three carbon atoms proceeds rapidly with hydrolysis.

(2) Amounts of water, etc.

In the process according to the present invention, water may be used in an amount which is equal to or greater than 0.5 times, preferably ranging from 2 to 10 times, more preferably ranging from 2 to 5 times, the gram equivalent of the alkoxy group in the silicic acid ester.

If the amount of water is smaller than 0.5 times the gram equivalent of the alkoxy group in the silicic acid ester, hydrolysis does not proceed sufficiently that the remaining alkoxy groups are carbonated, when baked thereby turning the product black.

It is preferred to use water which has been purified to a sufficient extent.

In the process according to the present invention, a hydrolytic catalyst may be used together with water.

The hydrolytic catalyst may appropriately include, for example, an acid or an alkali, although there is no restriction imposed upon its kind as long as it can adjust the pH of the mixture of the silicic acid ester with water. The acid may preferably include, for example, nitric acid, oxalic acid and acetic acid. The alkali may preferably include, for example, ammonia, triethylamine and ethylene diamine.

The pH of the mixture may usually range from about 3 to 10 in order to allow the hydrolysis of the silicic acid ester to proceed rapidly when the catalyst is used, although no limit is placed on the pH of the mixture.

(3) Siliceous particles

Siliceous particles to be dispersed in the mixture of the silicic acid ester with water contain particles having particle sizes greater than 400 μm in an amount of 10% by weight or smaller and having particle sizes smaller than 20 μm in an amount of less than 50% by weight, preferably having particle sizes greater than 300 μm in an amount of 10% by weight or smaller and having particle sizes smaller than 20 μm in the amount of less than 30% by weight. If the siliceous particles having particle sizes greater than 400μm are used in an amount which is equal to or greater than 10% by weight or the siliceous particles having particle sizes smaller than 20μm are used in the amount equal to or greater than 50% by weight, particles having particle sizes larger than 300 μm may be increased, in particular whilst the yield of particles having particle sizes in the range from 75μm to 300μm may be decreased whose particle sizes in the range are preferred as powders of the raw material for forming quartz crucibles.

The concentration of the siliceous particles is 10% by weight or greater, preferably 20% by weight or greater, with respect to the weight of silica formed when the silicic acid ester is roasted in the same amount as the silicic acid ester used for the mixture with water. If the siliceous particles are present in a concentration of less than 10% by weight with respect to the weight of silica formed when the silicic acid ester is roasted in the same amount as the silicic acid ester used for the mixture with water, the yield of silica glass powders may be reduced remarkably.

The siliceous particles to be used may include, for example, silica gel, synthetic silica powders, natural quartz flour and so on. In particular, in order to provide silica glass powders of high purity, it is preferred to re-use particles having particle sizes of 100μm or larger after classification from the synthetic silica glass powders synthesized by the process according to the present invention.

(4) Procedures for dispersing siliceous particles and drying the gel:

In the process according to the present invention, the siliceous particles may be dispersed and gelled by the following manner.

As the first procedure, the siliceous particles may be dispersed and gelled by adding the siliceous particles to the mixture of silicic acid ester with water in a rotary drier, for example, in a rotary evaporator, and then heating the resulting mixture, preferably at a temperature ranging from 20° to 60° C.

As the second technique, the siliceous particles may be dispersed by adding water to the mixture of silicic acid ester and siliceous particles or silicic acid ester to the mixture of water and siliceous particles in a rotary drier and then by heating the resulting mixture like the above first procedure.

In both of the above procedures the siliceous particles have particle sizes of greater than 400 μm in an amount less than 10% by weight and particle sizes of smaller than 20μm in an amount less than 50% by weight and are added in an amount or 10% by weight of greater with respect to the weight of silica formed when the silicic acid ester is roasted in the same amount as the silicic acid ester used for the mixture.

It is important that the siliceous particles are dispersed well in the mixture of the silicic acid ester and water. If the extent of dispersion is insufficient, a distribution of particle sizes of the resulting silica glass powders is not sufficiently steep.

In the process according to the present invention, the gel formed is dried at a temperature usually higher than 100° C. The gel is dried, for example, with the drier at a predetermined temperature.

(5) Baking temperature and time period:

The baking temperature may be above 1,000° C. like the baking temperature in a so-called sol-gel method. The baking time period may be usually 1 hour or longer.

(6) Miscellaneous:

The synthetic silica glass powders as prepared hereinabove may be in a pulverized shape and may be used conveniently as a raw material for silica glass products for the semiconductor industry, particularly quartz crucibles, and as a raw material for multicomponent glass used in optical communication because of their high purity.

The present invention will be described by way of examples in comparison with comparative examples.

Example 1

A three-necked glass flask having stirring blades covered with Teflon was charged with 3,044 grams (methoxy group; 80 gram equivalents) of methyl silicate. 4,320 grams (240 gram equivalents) of ion-exchanged water was gradually added to the flask at 20° C. over a period of 2 hours.

During its addition hydrolysis proceeded.

Thereafter, the reaction mixture was transferred to a rotary evaporator and the evaporator then was charged with 240 grams of silica glass powder (an average particle size of approximately 60μm) having 3% by weight of particle sizes exceeding 150 μm and 25% by weight of particle sizes smaller than 20 μm. It was found that, when 3,044 grams of methyl silicate was baked, silica was obtained in the yield of 1,202 grams. The rotary evaporator was then rotated at 40° C., dispersing the silica glass powders well to give a gel which, in turn, was dried at 150° C. and reduced pressure of 100 mmHg.

The dried gel was then pulverized during drying to yield powders having a maximum particle size of 350 μm and an average particle size of 214 μm.

The gel in a pulverized form was transferred to a silica glass crucible and the gel was baked at 1,050° C. for 4 hours, yielding synthetic silica powders which, in turn, were filtered to collect particles having particle sizes ranging from 75 μm to 300μm, which are suitable for formation of quartz crucibles. It was also found that the synthetic silica powders were obtained in a yield of 74% based on silica obtained from methyl silicate used for hydrolysis.

The X-ray analysis of the silica glass powders indicated no peak of crystal such as rock crystal and the pattern was broad like the usual silica glass. Hence, it was confirmed that the powders were silica glass. The amounts of impurities were observed for natural products and powders of this example by luminescent spectrometry analysis. The results are shown in TABLE below.

TABLE

| SAMPLES | NATURAL PRODUCTS | EXAMPLE 1 |
|---|---|---|
| Fe (ppm) | 0.3 | 0.02 |
| Na (ppm) | 0.2 | 0.04 |
| K (ppm) | 1 | 0.02 |
| Ca (ppm) | 0.5 | 0.05 |
| Mg (ppm) | below 0.1 | over 0.02 |
| Al (ppm) | 14 | over 0.2 |
| Li (ppm) | below 0.1 | over 0.02 |
| Cu (ppm) | below 0.1 | over 0.02 |
| Cr (ppm) | below 0.1 | over 0.02 |

Example 2

The dried gel was obtained in the same manner as in Example 1, except for 4,166 grams of ethyl silicate (ethoxy group, 80 gram equivalents) in place of 3,044 grams of methyl silicate. The dried gel was found to have a maximum particle size of 350 $\mu$m and an average particle size of 232 $\mu$m.

The gel in a powdery form was then baked in an electric furnace in the same manner as in Example 1, thereby resulting in silica glass powders in a pulverized form. The silica glass powders were filtered, thereby collecting synthetic glass powders having particle sizes in the range from 75 $\mu$m to 300$\mu$m in a yield of 79% based on silica formed from ethyl silicate used for hydrolysis.

Example 3

The dried gel was obtained in the same manner as in Example 1, except for ion-exchanged water in which the pH was adjusted to PH 3 with nitric acid. The dried gel was found to have a maximum particle size of 350 $\mu$m and an average particle size of 216$\mu$m.

The gel in a powdery form was then baked in an electric furnace in the same manner as in Example 1, thereby resulting in silica glass powders in a pulverized form.

The silica glass powders were then filtered, thereby collecting synthetic glass powders having particle sizes in the range from 75 $\mu$m to 300$\mu$m in a yield of 76% based on silica formed from ethyl silicate used for hydrolysis.

Comparative Example 1

The dried gel was obtained in the same manner as in Example 1, with the exception that silica glass powders were not added to a hydrolyzed solution. The dried gel was found to be in a granular form, not in a powdery form, having an average particle size as large as 3 mm.

The gel in a powdery form was then baked in an electric furnace in the same manner as in Example 1, thereby resulting in silica glass powders in a pulverized form. The silica glass powders were filtered, thereby collecting synthetic silica glass powders having particle sizes in the range from 75 $\mu$m to 300$\mu$m only and in a yield of 5% based on silica formed from ethyl silicate used for hydrolysis.

Comparative Example 2

In Comparative Example 1, the gel in the granular form prepared by sintering was pulverized using an alumina ball mill and balls, thereby yielding silica glass powders having an average particle size of 205$\mu$m. The silica glass powders were then filtered to collect particles having particle sizes ranging from 75$\mu$m to 300$\mu$m. The silica glass powders yielded the amount of 39% based on silica formed from methyl silicate used for hydrolysis.

It was further found that aluminium was contained in the amount of 32 ppm as impurities.

As have been described hereinabove, the process according to the present invention presents the advantages that contamination of impurities can be prevented because no mechanical pulverizing step is required; silica glass powders of high purity can be prepared by a simple operation; and a distribution of particle sizes of the powders formed is steep and the yield is high. Hence, the process according to the present invention is an industrially useful one for the preparation of silica glass powders.

What is claimed is:

1. A process for the preparation of silica glass powders comprising:

preparing a dispersion of siliceous particles in a mixture of silicic acid ester and an amount of water equal to or larger than 0.5 gram equivalent of an alkoxy group of the silicic acid ester, wherein said siliceous particles contain particles having particle sizes larger than 400 $\mu$m in an amount of less than 10% by weight and particles having particle sizes smaller than 20 $\mu$m in an amount of less than 50% by weight and wherein said siliceous particles are dispersed in an amount equal to or larger than 10% by weight of the weight of silica prepared by roasting the silicic acid ester in an amount which is the same as the amount of silicic acid ester used for the preparation of the dispersion;

gelling the dispersion to give a gel;

drying the gel; and baking the dried gel to obtain a silica glass powder.

2. A process as claimed in claim 1, wherein the silicic acid ester has an alkoxy group having from one to three carbon atoms.

3. A process as claimed in claim 1, wherein the silicic acid ester comprises methyl silicate, ethyl silicate or propyl silicate.

4. A process as claimed in claim 1, wherein the mixture contains a hydrolytic catalyst.

5. A process as claimed in claim 4, wherein the hydrolytic catalyst comprises at least one of an acid and an alkali.

6. A process as claimed in claim 5, wherein the at least one of an acid and an alkali comprises nitric acid, oxalic acid or acetic acid.

7. A process as claimed in claim 5, wherein the at least one of an acid and an alkali comprises ammonia, triethylamine or ethylene diamine.

8. A process as claimed in claim 1, wherein the siliceous particle comprises silica gel, synethetic silica powder, natural quartz flour or synthetic quartz glass powder.

9. A process as claimed in claim 1, wherein the siliceous particles contain less than 10% by weight of particles having particle sizes exceeding 300 $\mu$m and less than 30% by weight of particles having particle sizes less than 20$\mu$m.

10. A process as claimed in claim 1, wherein said siliceous particles are dispersed in an amount equal to or larger than 20% by weight of the weight of silica prepared by roasting the silicic acid ester in an amount which is the same as the amount of silicic acid ester used for the preparation of the mixture.

11. A process as claimed in claim 1, wherein said dispersion is heated at a temperature ranging from 20° C. to 60° C.

12. A process as claimed in claim 1, wherein the gel is dried at a temperature above 100° C.

13. A process as claimed in claim 1, wherein the dried gel is baked at a temperature above 1,000° C. for 1 hour or longer.

14. A process as claimed in claim 1 wherein a majority of the particles of silica glass powder obtained have particle sizes in the range of 75 to 300 μm.

15. A process as claimed in claim 1 wherein the dried gel is baked at a temperature of about 1,050° C.

* * * * *

UNITED STATES PATENT AND TRADEMARK OFFICE
CERTIFICATE OF CORRECTION

PATENT NO. : 5,028,247

DATED : July 2, 1991

INVENTOR(S) : Asami et al.

It is certified that error appears in the above-identified patent and that said Letters Patent is hereby corrected as shown below:   On the Title page, item [57], Abstract, line 2, change "," to --and--;

line 2, change "and" to --to--.

Signed and Sealed this

Fifteenth Day of June, 1993

Attest:

MICHAEL K. KIRK

Attesting Officer    Acting Commissioner of Patents and Trademarks